(12) United States Patent
Koshiyouji

(10) Patent No.: US 6,463,028 B1
(45) Date of Patent: Oct. 8, 2002

(54) DISK CARTRIDGE AND DISK CARTRIDGE SYSTEM

(75) Inventor: Takashi Koshiyouji, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/485,687

(22) PCT Filed: Jun. 2, 1999

(86) PCT No.: PCT/JP99/02920
§ 371 (c)(1),
(2), (4) Date: Feb. 25, 2000

(87) PCT Pub. No.: WO00/00978
PCT Pub. Date: Jan. 6, 2000

(30) Foreign Application Priority Data

Jun. 26, 1998 (JP) .......................................... 10-180383

(51) Int. Cl.[7] .............................................. G11B 23/03
(52) U.S. Cl. ....................................... 369/291; 369/289
(58) Field of Search ................................ 369/291, 289, 369/290; 360/133; 206/307, 308.1, 308.3, 309, 312, 313

(56) References Cited

U.S. PATENT DOCUMENTS 4,428,483 A * 1/1984 Narita et al. ................. 206/459
4,463,850 A * 8/1984 Gorog ......................... 206/309
4,476,978 A * 10/1984 Saito ........................... 206/444
5,537,389 A 7/1996 Kuwa et al.
6,205,114 B1 * 3/2001 Takekoh et al. ............. 369/291

FOREIGN PATENT DOCUMENTS

EP 0 838 819 A1 4/1998
JP 6/150603 5/1994
JP 6-215526 8/1994

OTHER PUBLICATIONS machine translation of JP 06–215526.*
machine translation of JP 06–150603.*
Examination Report Under Section 18(3).

* cited by examiner

Primary Examiner—David L. Ometz
(74) Attorney, Agent, or Firm—Oblon, Spivak, McClelland, Maier & Neustadt, P.C.

(57) ABSTRACT

A disk holder, which is detachable from a case with an optical disk being held by the disk holder, is detachably fitted to a case of a disk cartridge. The disk holder is detached from the case with the optical disk set in the retained state, and the disk holder, together with the optical disk, is loaded into a case of an adapter cartridge. The adapter cartridge is so shaped and dimensioned as to be fitted to a disk drive for driving an optical disk greater in diameter than the optical disk.

13 Claims, 7 Drawing Sheets

DISK CARTRIDGE AND DISK CARTRIDGE SYSTEM

BACKGROUND OF THE INVENTION

1. Field of the Invention

The present invention relates to a disk cartridge holding an optical disk therein and to a cartridge system combined with an adapter cartridge for allowing the optical disk which is held in the disk cartridge to be fitted to a disk drive for driving another optical disk with a different diameter.

2. Discussion of the Background

In recent years, an optical disk, such as a magneto-optical recording type, phase change type and DVD, has been used as a large-capacity recording medium in place of a floppy disk. This type of optical disk is usually held in a case and used as a disk cartridge.

Further, as this type of disk cartridge, a type has been proposed in which, in order to increase the degree of freedom in usage, an optical disk is removed from the case and is used as a single unit.

Usually, the case of the disk cartridge is so formed as to have a flat rectangular shape and has a window section on each side to expose a portion of the optical disk and hub. A slidable shutter is provided on the case to allow the window section to be opened and closed. When the disk cartridge is loaded into an optical disk drive, the shutter is automatically opened to allow a drive-side optical head to perform information processing on the optical disk through the window section.

Currently a plurality of kinds of disks of different sizes, such as a 80 mm and a 120 mm disk, have been proposed as the optical disk. The disk cartridges holding an optical disk therein have different sizes. Therefore, even in the case of an optical disk drive, a plurality of kinds of disk drives fitted to the sizes of their disk cartridges have been proposed.

In this situation, there are different disk drives for different kinds of disk cartridges with different sizes. For this reason, it has been difficult to drive disk cartridges of different kind and size by a single disk drive and there arises a compatibility problem. In the case where, in particular, use is made of a disk cartridge with an optical disk of a smaller size held therein, its window section is narrower than a disk cartridge with an optical disk of a large size held therein and, for the case of a disk drive for a larger-size optical disk, difficulty has been encountered in insertion and in driving operation.

SUMMARY OF THE INVENTION

The present invention has been contrived in consideration of the above circumstances and its object is to provide a disk cartridge which can achieve a compatibility between disk-like recording media of different sizes and enlarge the range of use, and to provide a cartridge system having the disk cartridge.

In order to achieve the above object, a disk cartridge according to the present invention comprises a case holding a disk-like recording medium therein and having a window section through which a portion of the recording medium is exposed and an access opening via which the recording medium is inserted and withdrawn into and out of the case; a shutter slidably mounted on the case and adapted to open and close the window section; and a disk holder for opening and closing the access opening and detachably fitted to the case with the recording medium retained therein.

According to the disk cartridge of the present invention, the case has a pair of rectangular main walls opposite to each other and sidewalls formed along peripheral edges of the main walls, the access opening is formed continuously in the main walls and sidewalls, and the disk holder has a plate-like base section constituting a part of one of the main walls and capable of placing the recording medium thereon and an opposite section constituting a part of the other main wall, facing the base section at a predetermined distance and allowed to be contacted with the recording medium.

According to the disk cartridge thus structured, by detaching the disk holder from the case, it is possible to, through the disk holder, withdraw the optical disk out of the case and inserted into an associated case without directly touching the optical disk by fingers.

Further, a cartridge system according to the present invention comprises an adapter cartridge so formed as to have a size fitted to a disk-like recording medium of a first diameter, and a disk cartridge storing therein a disk-like recording medium of a second diameter smaller than the first diameter, wherein the adapter cartridge comprises a case allowing the disk-like recording medium of the first diameter to be held therein and having a window section through which an interior is exposed and an access opening via which the recording medium is inserted and withdrawn into and out of the case, a shutter slidably mounted on the case and adapted to open and close the window section, and a lid member mounted on the case, for opening and closed the access opening.

The disk cartridge comprises a case storing therein the recording medium of the second diameter and having a window section through which a part of the recording medium is exposed and an access opening via which the recording medium is inserted and withdrawn into and out of the case, a shutter slidably mounted on the case to open and close the widow section, and a disk holder adapted to open and close the access opening and detachably fitted to the case with the recording medium retained therein, and the adapter cartridge enables the recording medium and disk holder with the recording medium retained therein to be inserted into the case via the access opening of the case.

According to the cartridge system thus structured, the disk holder with the recording medium retained therein is withdrawn out of the case and, together with the recording medium, inserted into the adapter cartridge. By loading this adapter cartridge into a disk drive for driving the recording medium of the first diameter, it is possible to perform information processing on the recording medium of the second diameter with the use of this disk drive.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DESCRIPTION OF THE PREFERRED EMBODIMENTS

A disk cartridge and cartridge adapter according to an embodiment of the present invention will be described below with reference to the accompanying drawing. First, an explanation will be made about the disk cartridge 10.

Figure 1:
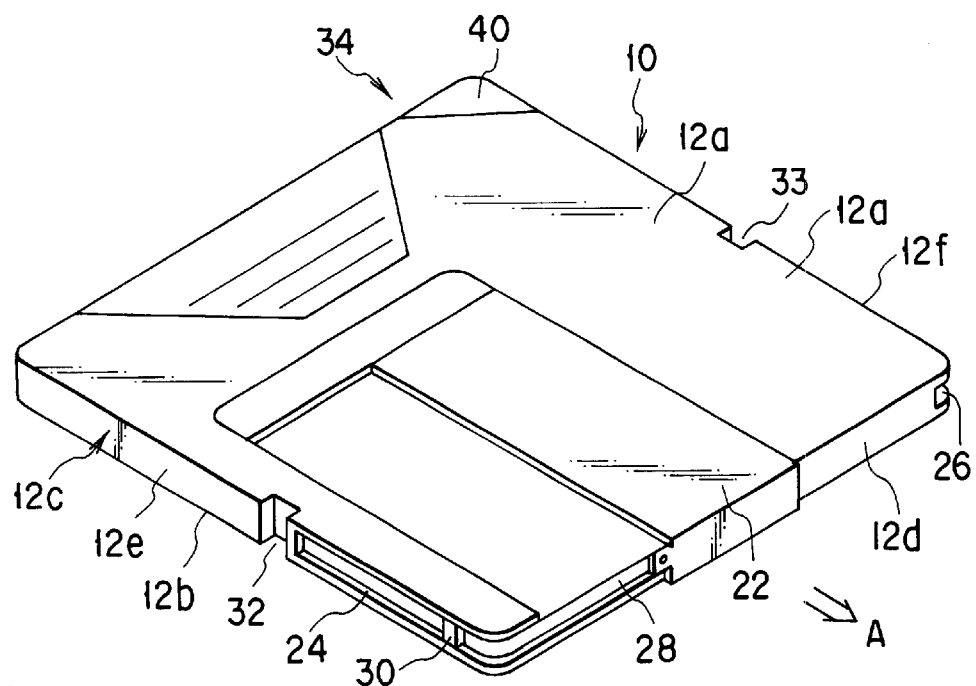
FIG. 1 is a perspective view showing a disk cartridge according to an embodiment of the present invention with a shutter set in a closed state.
Figure 2:
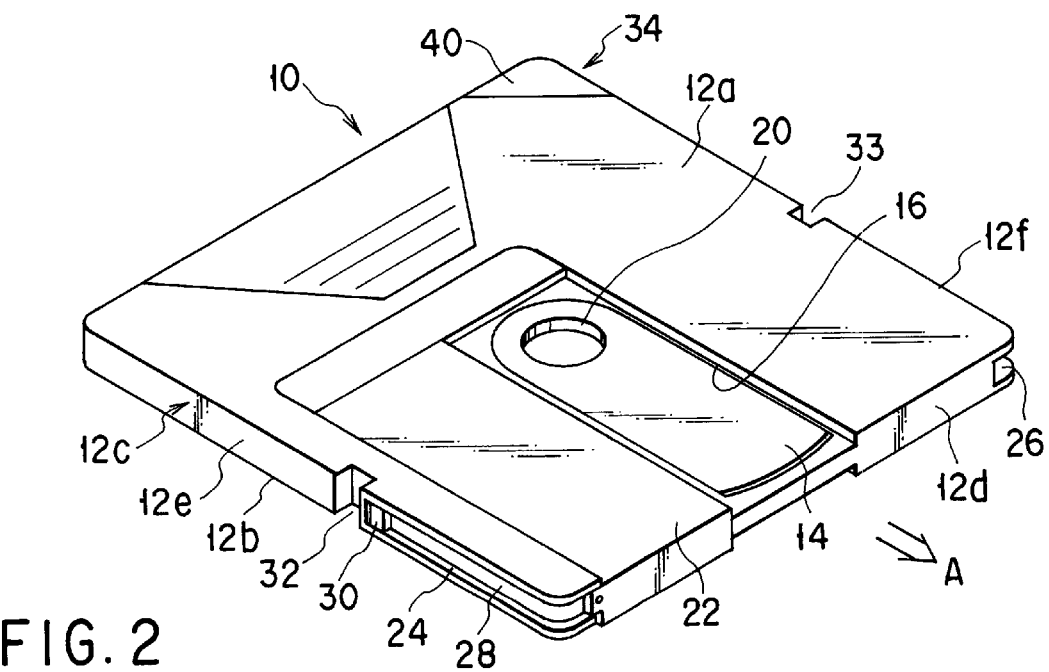
FIG. 2 is a perspective view showing the above-mentioned disk cartridge with the shutter set in an open state.
Figure 3:
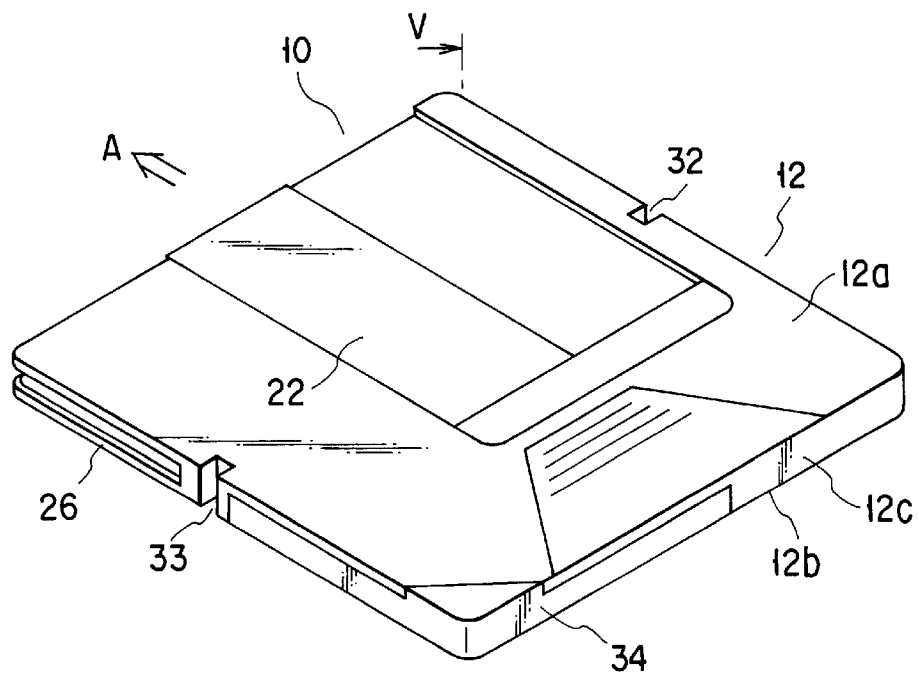
FIG. 3 is a perspective view showing a rear side of the disk cartridge.
Figure 4:
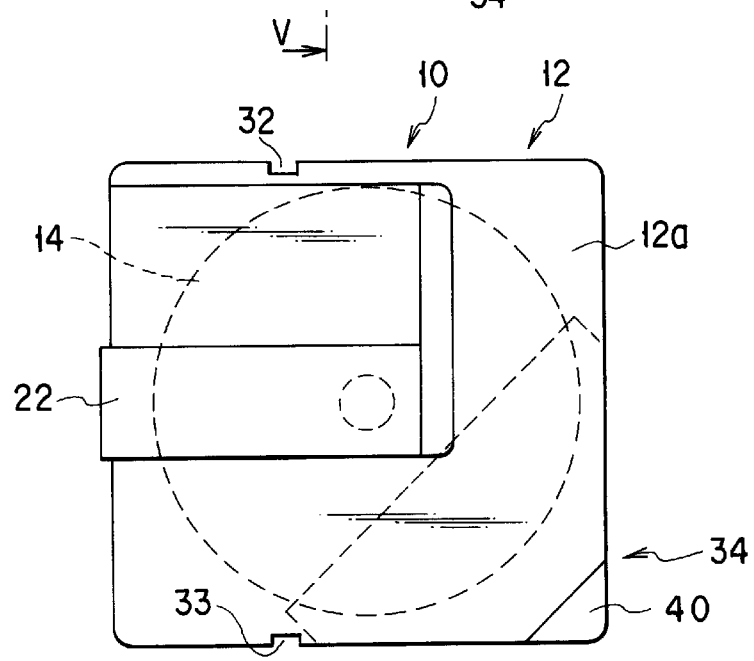
FIG. 4 is a plan view showing the disk cartridge.
Figure 5:
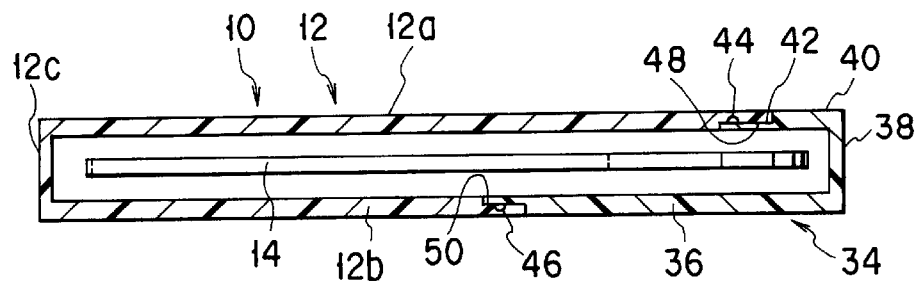
FIG. 5 is a cross-sectional view as taken along line V—V in FIG. 3.

As shown in FIGS. 1 and 2, a disk cartridge 10 has a flat rectangular case 12 with an optical disk 14 of, for example, 80 mm in diameter received therein as an information recording medium. The case 12 has a pair of mutually opposite rectangular main walls 12a, 12b and sidewalls 12c provided along peripheral edges of these main walls. The respective main walls 12a, 12b each have a corresponding window section 16 for gaining access to the optical disk 14. The respective window sections 16 extend from a substantially center of these main walls in an insertion direction A of the disk cartridge 10 to near a front end face 12d of the case, and have a predetermined width. A center hole 20 is provided in the central portion of the optical disk 14.

A U-shaped shutter 22 is slidably mounted on the case 12 and the window section 16 is opened and closed by the shutter 22. The shutter 22 is normally urged toward a closing position of FIG. 1, where the shutter closes the windows 16, by a spring, not shown, provided in the case 12.

A groove 24 is formed in the front end face 12d of the case 12 and the side face 12e on a shutter opening side and extends from near the window 16 toward a substantially middle of the side face 12e. Further, within the groove 24 a slide pin 30 and belt 28 are provided, the slide pin being slidable along the side face 12e and the belt linking the slide pin to the shutter 22. By causing the slide pin 30 to slide in a direction opposite to the insertion direction A, the shutter 22 is pulled through the belt 28 and moved to an opening position as shown in FIG. 2.

Recesses 32 and 33 are provided in the intermediate portions of the side face 12e and side face 12f, respectively, of the case 12. And a guide groove 26 is formed in the side face 12f and extends from near the recess 33 to the front end face 12d of the case 12.

As shown in FIGS. 3 to 6, an access opening 32 is formed at a rear face-side corner of the case 12 to allow the optical disk 12 to be loaded to and unloaded from the case 12. A disk holder 34 is detachably fitted to the access opening 32 and closes the access opening 32 and constitutes a part of the case 12.

The access opening 32 is formed by triangularly cutting off one corner portion of the main wall 12a and one corresponding corner portion of the main wall 12b of the case 12 and cutting off those portions of the sidewalls 12c extending from the corner portion toward both sides. In this case, the main wall 12b side is so cut off as to be made adequately greater than the main wall 12a side, to be made to an extent not reaching the window section 16 and shutter 22 and to be made to have a width greater than the diameter of the optical disk 14.

As shown in FIGS. 3 to 8, the disk holder 34 integrally has a base section 36 of a triangular plate-like configuration, sidewalls 38 erected along two orthogonal side edges of the base section, and a triangular opposite section 40 facing the corner portion of the base section at a predetermined spacing and continuous with the sidewalls. An elastically deformable engaging claw 42 extends from the opposite section 40 and faces the base section 36 with a predetermined spacing. An engaging projection 44 is formed at the extending end of the engaging claw 42 serving as an engaging section. A pair of engaging projections 46 are formed on a bottom surface of an open-side end portions of the base section 36.

It is to be noted that, as will be set out below, the base section 36, sidewalls 38 and opposite section 40 constitute a retaining section for engaging the optical disk and retaining the optical disk.

The disk holder 34 is so dimensioned as to correspond to the access opening 32 of the case 12 and is detachable at the access opening 32. That is, the base section 36 and opposite section 40 are so shaped and dimensioned as to correspond to the cutouts of the main walls 12b, 12a of the case 12 and the sidewalls 38 are so shaped and dimensioned as to correspond to the cutout of the sidewalls 12c of the case 12. A recess 48 continuous with the access opening 32 is formed in the inner surface of the main wall 12a of the case 12 and a recess 50 continuous with the access opening 32 is formed in the inner surface of the main wall 12b.

By causing the engaging claw 42 and open-end side end portion of the base section 36 to engage the case-side recesses 48 and 50, the disk holder 34 is fitted in the case 12 and closes the access opening 32. In such a fitted state, the opposite section 40 and base section 36 of the disk holder 34 constitute the portions of the main walls 12a, 12b of the case 12 and, further, the sidewalls 38 constitute the portions of the sidewalls 12c of the case 12. And the base section 36 faces the optical disk 14 received in the case 12. In this case, the base section 36 faces the optical disk to an extent not overlapping the center hole of the optical disk 14 and window sections 16.

When the thus configured disk cartridge 10 is loaded into a disk drive, not shown, in an arrow A direction in FIG. 1, the shutter 22 is automatically opened by a drive-side shutter opening/closing mechanism. Through the window section 16 a turntable, not shown, on the drive side and optical head enter the case 12 and the optical disk 14 is placed on the turntable and positioned to face the optical head. In this state, the optical disk 14 is rotated by the turntable at a predetermined speed to allow desired information processing to be done by the optical head.

Figure 6:
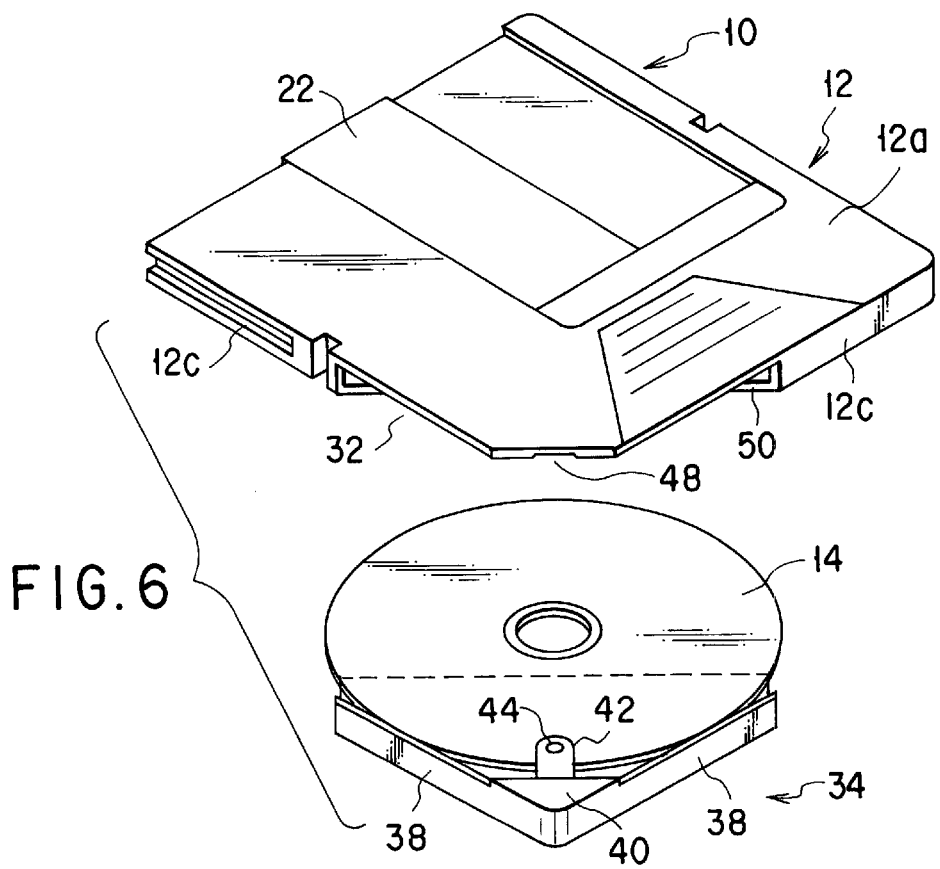
FIG. 6 is an exploded, perspective view showing the disk cartridge and its disk holder removed therefrom.
Figure 7:
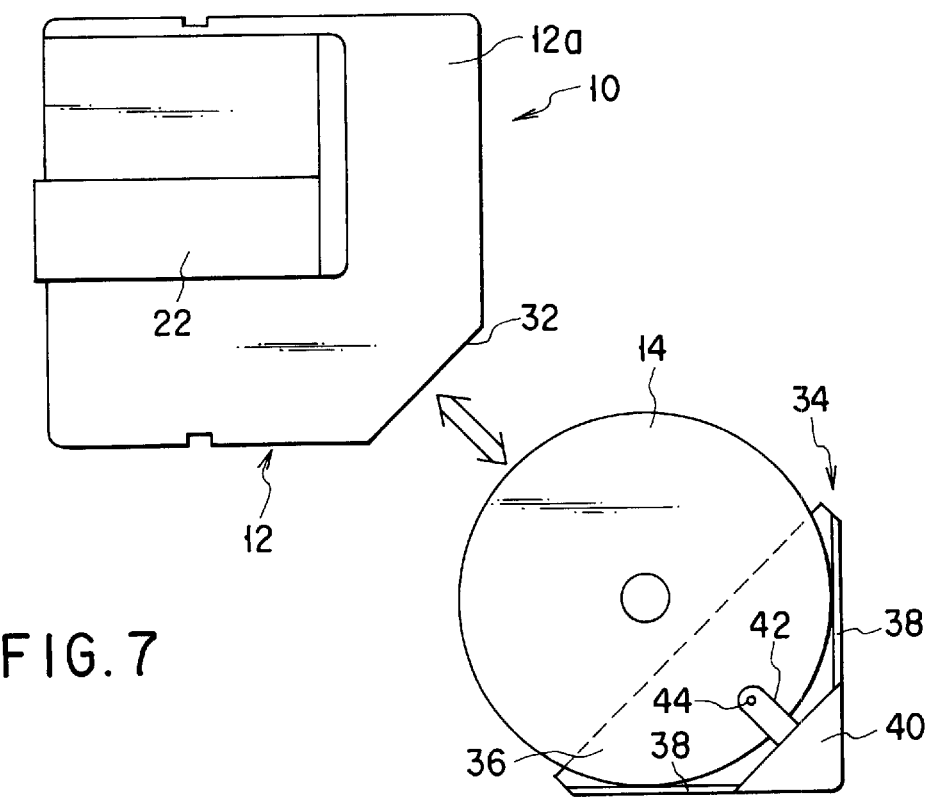
FIG. 7 is a plan view showing a state in which the disk holder is removed from the above-mentioned disk cartridge.
Figure 8:
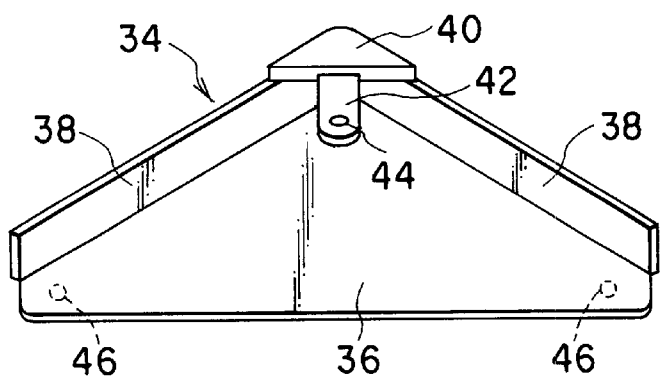
FIG. 8 is a perspective view showing the above-mentioned disk holder.
Figure 9:
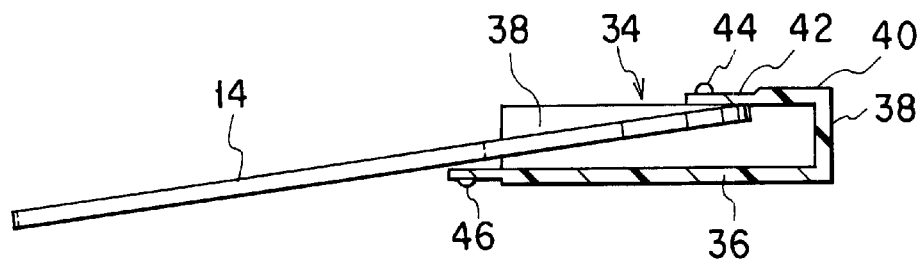
FIG. 9 is a cross-sectional view showing a state in which an optical disk is held by the disk holder.

According to the disk cartridge 10 thus configured, the optical disk 14 can be taken out by withdrawing the disk holder 34 out of the case 12 to open the access opening 32. At this time, as shown in FIGS. 6 and 7, with the optical disk 14 displaced toward the disk holder side to abut the outer peripheral edge of the optical disk 14 against the inner surface of the sidewall 38 of the disk holder 34, the disk holder 34 is withdrawn. By doing so, as shown in FIGS. 6 and 9, the optical disk 14 has its portion placed on the base portion 36 of the disk holder 34 and its outer peripheral edge caught on the inner surface of the opposite section 40 to allow the disk to be so retained on the disk holder 43, so that the disk, together with the disk holder, can be withdrawn out of the case 12. As a result, with the disk holder 34 grasped, the optical disk 14 can be withdrawn out of the case without directly touching the optical disk 14 by fingers.

Even in the case where the optical disk 14 is loaded into the case 12, it can be so done by fitting the disk holder 34 into the access opening 32 of the case 12 with the optical disk 14 retained by the disk holder 34.

Next, an explanation will be made about an adapter cartridge. This adapter cartridge 50 is so formed as to be fitted to an optical disk of, for example, 120 mm and can be mounted in a disk drive for driving the optical disk of 120 mm.

Figure 10:
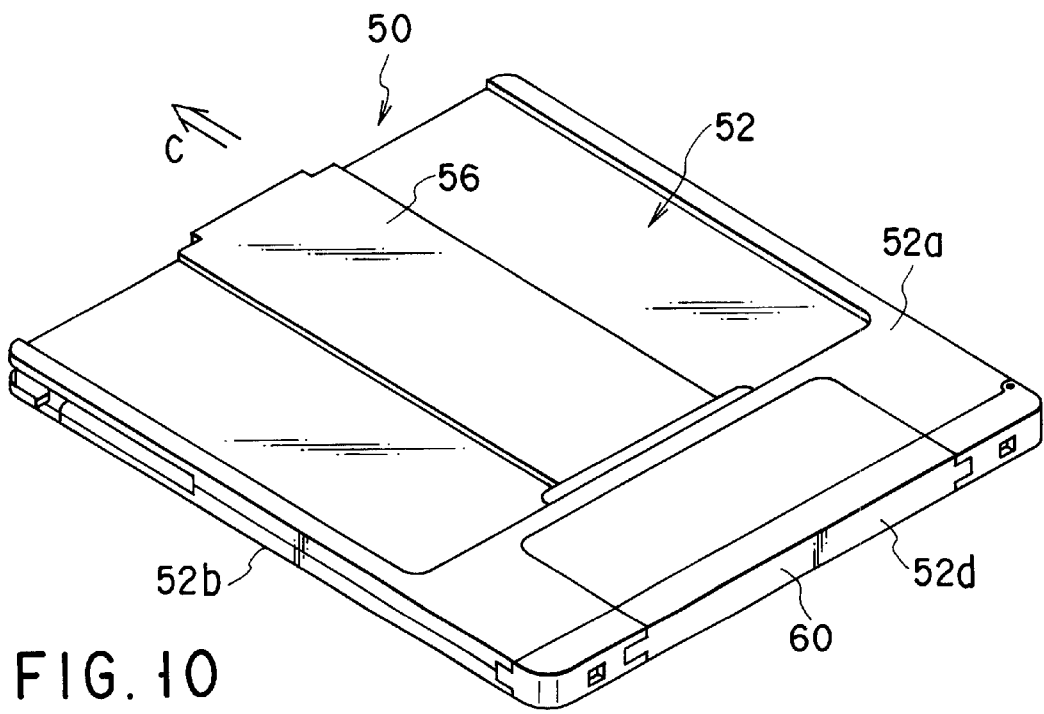
FIG. 10 is a perspective view showing an adapter cartridge according to an embodiment of the present invention.
Figure 11:
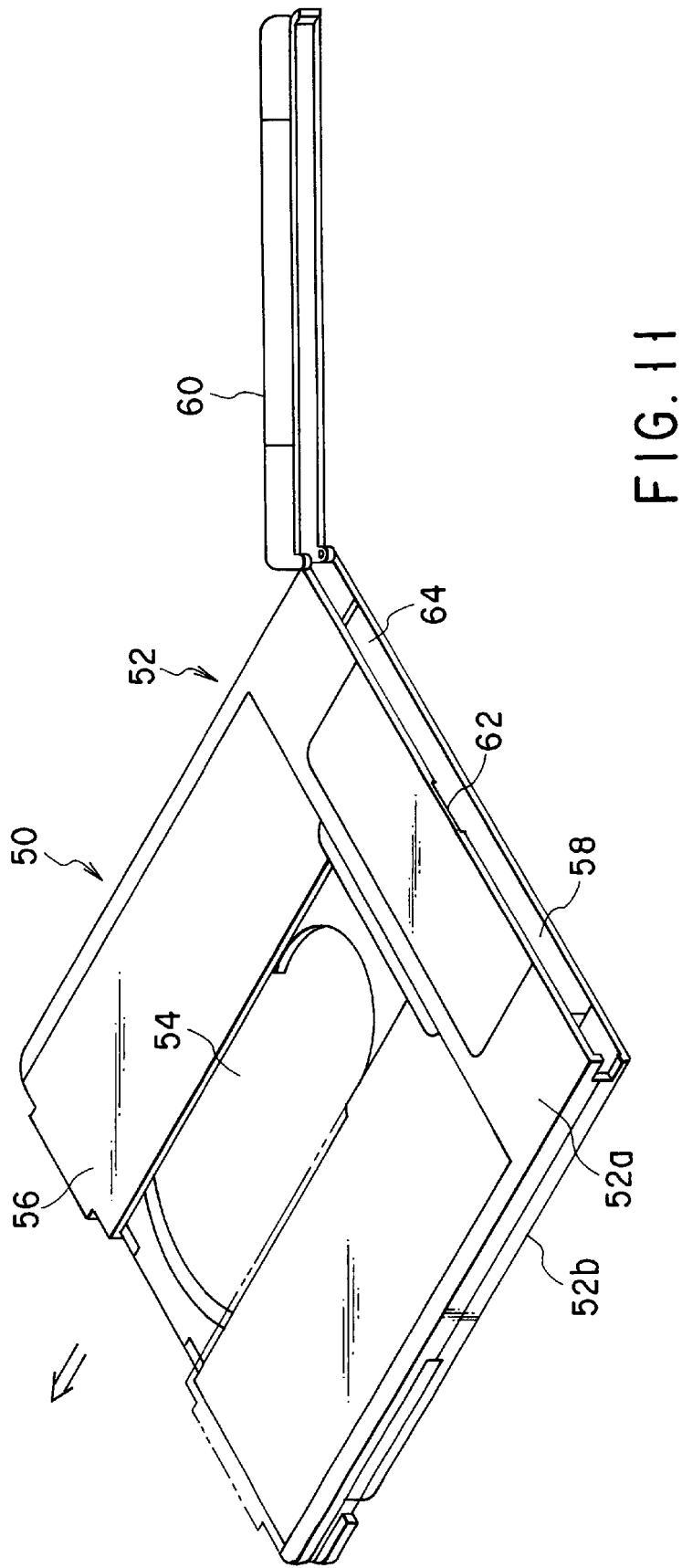
FIG. 11 is a perspective view showing the adapter cartridge with its shutter and lid member in an opened state.

As shown in FIGS. 10 and 11, the adapter cartridge 50 is equipped with a flat rectangular case 52 which is shaped and dimensioned to allow an optical disk of 120 mm to be held therein. The case 52 has a pair of mutually opposite, substantially rectangular main walls 52a, 52b. Window sections 54 are mutually oppositely formed in the main walls to allow access to be gained to the interior of the case 52. The respective window section 54 extends to near a front end face 52c of the case 52 from a substantially center of the case 52 in an insertion direction c of the adapter cartridge 50 associated with a disk drive.

A both-side integral type shutter 56 is slidably mounted on the case 52 to allow the window sections 54 to be opened and closed. The shutter 56 is slidable in a horizontal direction to the front end face 52c of the case 52 between a closed position closing the window section 54 as shown in FIG. 10 and two open positions located one at each side of the closing position as indicated by solid line and two dots and dashed lines in FIG. 11 and opening the window 54. The shutter 56 is urged toward a normally closed position by two shutter springs, not shown, placed on both sides of the window sections 54 within the case 52.

The rear end face of the case 52 is opened to define an insertion opening 58 through which the optical disk, etc., is loaded into, and unloaded from, the case 52. The insertion opening extends over a full length of the rear end face of the case. Further, a lid member 60 is swingably mounted on the case 52 to open and close the insertion opening 58. The lid member 60 constitutes a rear wall 52a of the case 52 in a closed position.

As shown in FIG. 11, an engaging recess 62 continuous with the insertion opening 58 is formed in the inner surface of the main wall 52a and an engaging recess 64 continuous with the insertion opening 58 is formed in the inner surface of the main wall 52b. As will be set out below, the engaging claw 42 and base section 36 of the disk holder 34 removed from the case 12 of the disk cartridge 10 are engageable with the recesses 62 and 64, respectively.

The adapter cartridge 50 thus structured is used in the case where the optical disk 14 of 80 mm unloaded from the above-mentioned disk cartridge 10 is loaded into the disk drive for driving an optical disk of 120 mm and is driven.

Figure 12:
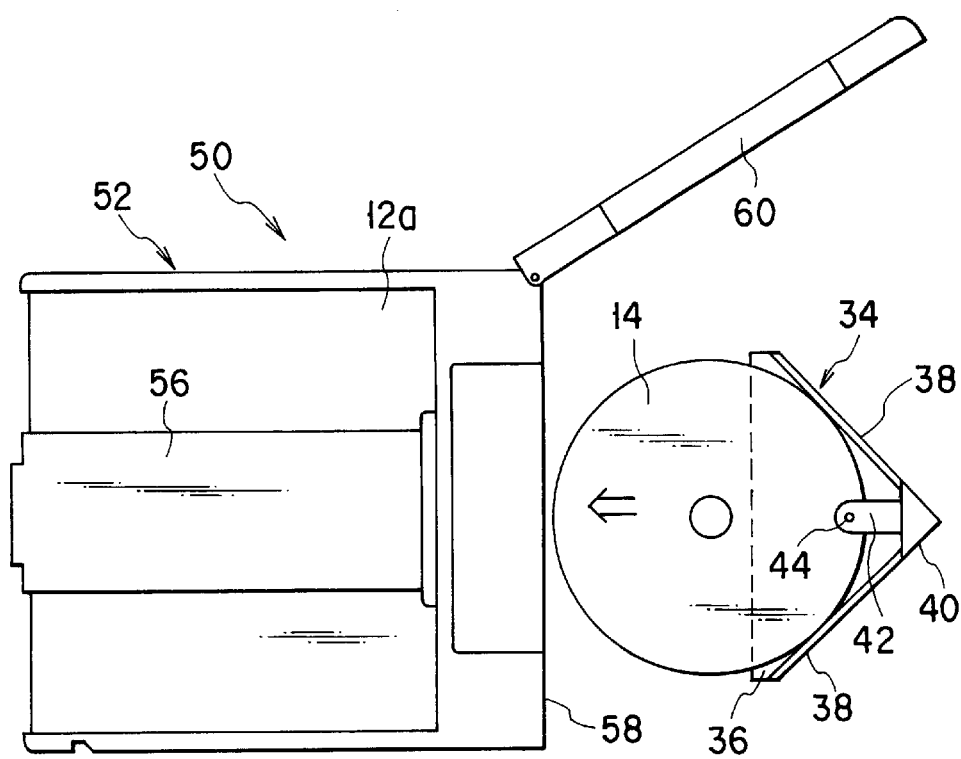
FIG. 12 is a plan view showing a state just before the disk cartridge with the optical disk retained therein is mounted in the adapter cartridge.

That is, in this case, as shown in FIGS. 6 and 7, the disk holder 34 is removed from the disk cartridge 10 and the optical disk 14 is withdrawn from the case 12 in a state retained by the disk holder. Then, as shown in FIG. 12, the lid member 60 of the adapter cartridge 50 is opened and, by doing so, the insertion opening 58 is opened. In this state, the optical disk 14 retained by the disk holder 34 is, together with the disk holder 34, inserted into the case 52 via the insertion opening 58.

Figure 13:
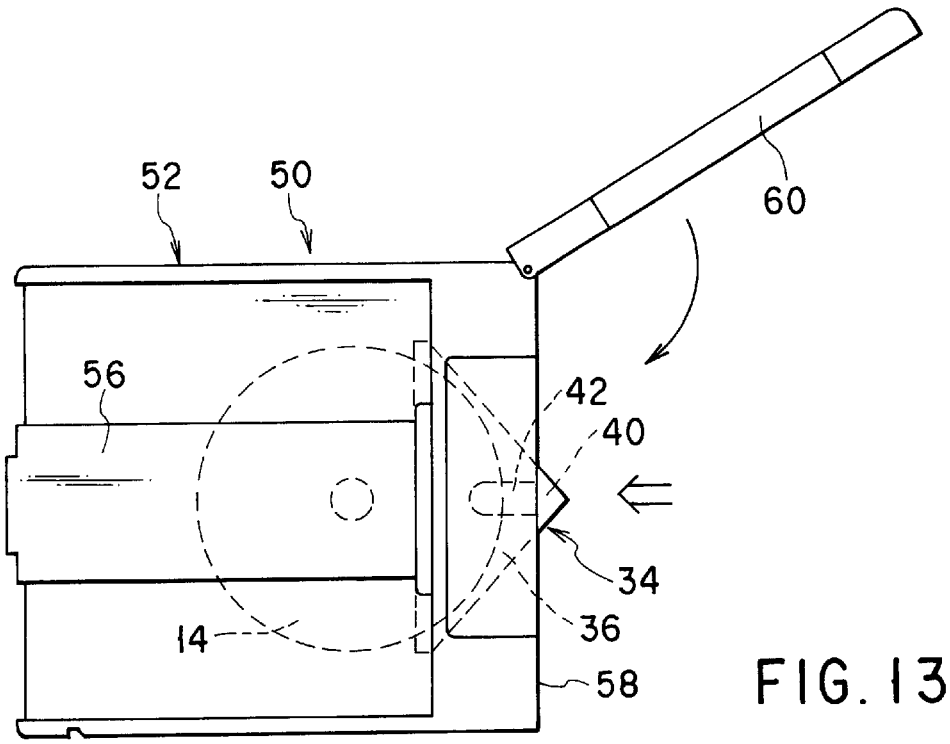
FIG. 13 is a plan view showing a state in which the disk holder holding the optical disk is inserted into the adapter cartridge.

As shown in FIG. 13, until a whole optical disk 14 is received into the case 52, the disk holder 34 is inserted into the case 52 to allow its engaging claw 42 and base section 35 to engage the respective engaging recesses 62 and 64. Thereafter, the lid member 60 is closed and hence the insertion opening 58 is closed and the end portion of the disk holder 34 is covered by the lid member 60, thereby to complete the loading of the optical disk 14.

Figure 14:
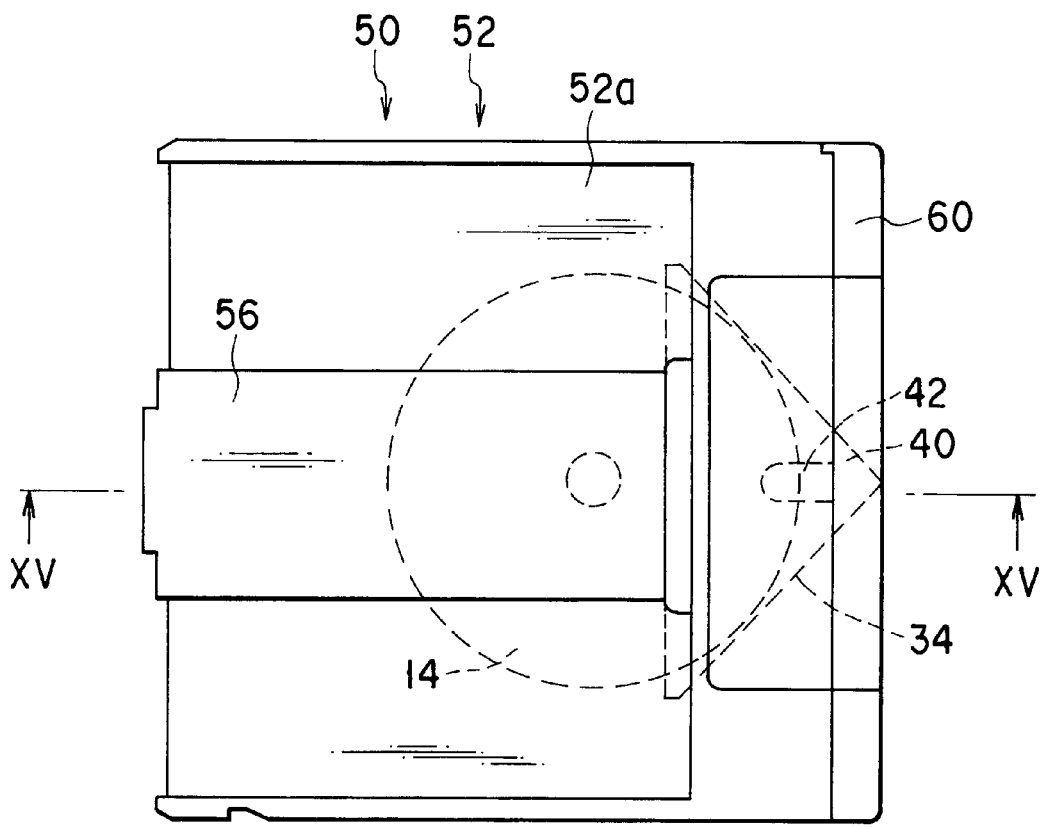
FIG. 14 is a plan view showing a state in which the disk holder with the optical disk retained there has been mounted in the adapter cartridge.
Figure 15:
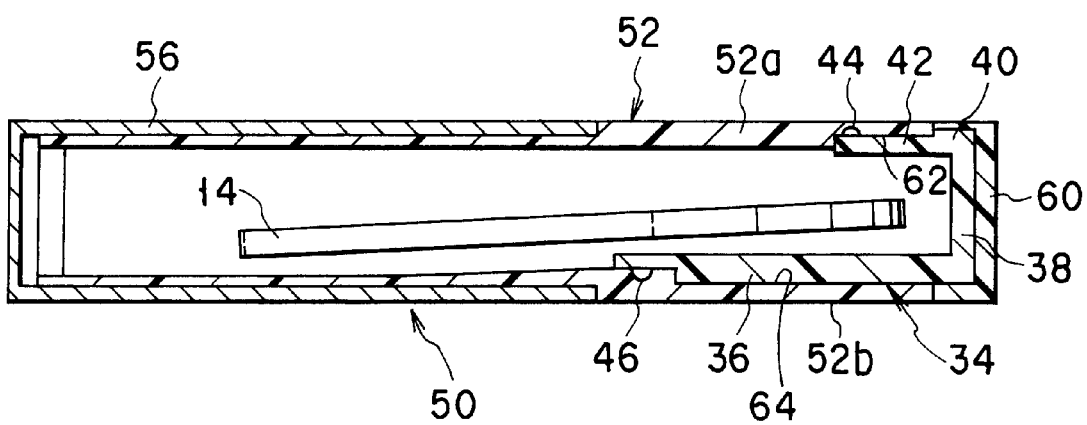
FIG. 15 is a cross-sectional view as taken along line XV—XV in FIG. 14.

As shown in FIGS. 14 and 15, with the optical disk 14 and disk holder 34 loaded into the adapter cartridge 50, the disk holder 34 is retained in a predetermined position by the main walls 52a, 52b of the case 50 and lid member 60. Within the case 52, the optical disk 14 is so set as to allow its surface direction position and its position orthogonal in direction to the disk surface to be restricted to a given extent and is retained in a predetermined area suitable to its driving operation.

By, in this way, loading the adapter cartridge 50 holding the 80 mm optical disk 14 therein into a disk drive for driving a 120 mm optical disk, it is possible to drive the 80 mm optical disk 14 by the disk drive and perform information processing.

According to the disk cartridge 10 and adapter cartridge 50 thus structured, it is possible that, by the use of the disk holder 34 and without directly touching the optical disk 14 by fingers, the optical disk 14 is detachably mounted in the disk cartridge 10 and it is also inserted and withdrawn into and out of the adapter cartridge 52. By loading the optical disk 14 into the adapter cartridge 50, it is possible to perform information processing on the 80 mm optical disk 14 with the use of the disk drive for driving the 120 mm optical disk. It is, therefore, possible to establish a compatibility between the disk drives and enlarge the range of use of the disk drive and optical disk.

The present invention is not limited to the above-mentioned embodiments and various changes or modifications can be made within a scope of the present invention. For example, the size of the optical disk is not restricted in the above-mentioned embodiment and, as required, can be selected. Further, the shape of the disk holder 34 can be variously changed or modified, as required, so long as the holder is so shaped as to retain the optical disk and to enable it to be detached from the disk cartridge. Still further, the shape and position of the access opening of the optical disk provided at the case of the disk cartridge can be selected variously as required.

As described in detail, according to the present invention, the disk cartridge is so structured as to be equipped with a disk holder detachable with a recording medium retained relative to the case and, by the use of the adapter cartridge capable of mounting the disk holder with the recording medium retained therein, it is possible to provide a disk cartridge, and a cartridge system equipped with the disk cartridge, capable of achieving a compatibility between disk-like recording media of different sizes and entarging the range of use of the recording media.

What is claimed is:

1. A disk cartridge comprising:

a case holding a disk-shaped recording medium therein and having a window section through which a part of the recording medium is exposed and an access opening via which the recording medium is inserted and withdrawn into and out of the case, the case having a pair of rectangular main walls opposite to each other and erected sidewalls formed along peripheral edges of the main walls, and the access opening being formed at a corner portion of the case and continuous with the main wall and sidewalls, a shutter slidably mounted on the case, for opening and closing the window section; and a disk holder for opening and closing the access opening, the disk holder being detachably fitted to the case and detachable from the case with the recording medium being held by the disk holder, the disk holder including a plate-shaped base section formed in a triangular configuration, constituting a part of one of the main walls and capable of placing the recording medium thereon, an opposite section constituting a part of the other main wall facing the base section at a predetermined spacing and allowed to be contacted with the recording medium, and side walls linking the base section to the opposite section, constituting a portion of the sidewall of the case and allowed to be contacted with an outer peripheral edge of the recording medium.

2. A disk cartridge according to claim 1, wherein the sidewalls are arranged along side edges of the base section and extend in a mutually intersecting direction.

3. A disk cartridge according to claim 2, wherein the opposite section has an engaging claw for elastically engaging the main wall of the case.

4. A disk cartridge according to claim 1, wherein the opposite section has an engaging claw for elastically engaging the main wall of the case.

5. A disk cartridge according to claim 1, wherein the disk holder has a retaining section engaging the recording medium to retain the recording medium.

6. A disk cartridge according to claim 1, wherein the disk holder has a retaining section for engaging that portion of the recording medium which is other than a central portion and other than an area opposite to the window sections of the case, to retain the recording medium.

7. A disk cartridge according to claim 6, wherein the retaining section of the disk holder includes the base section, the opposite section, and the sidewalls.

8. A disk cartridge according to claim 1, wherein the disk holder has an engaging section elastically engaging the case.

9. A cartridge system comprising an adapter cartridge having a size fitted to a disk-shaped recording medium with a first diameter, and a disk cartridge holding therein a disk-shaped recording medium with a second diameter smaller than the first diameter, wherein the adapter cartridge comprises a case for holding therein the disk-shaped recording medium with the first diameter, the case having a window section through which an interior of the case is exposed and an access opening via which the recording medium is inserted and withdrawn into and out of the case, a shutter slidably mounted on the case, for opening and closing the window section, and a lid member mounted on the case to open and close the access opening; and the disk cartridge comprises a case holding therein the recording medium with the second diameter and having a window section through which a part of the recording medium is exposed and an access opening via which the recording medium is inserted and withdrawn into and out of the case, a shutter slidably mounted on the case to open and close the window section, and a disk holder for opening and closing the access opening, the disk holder being detachably fitted to the case and detachable from the case with the recording medium being held by the disk holder; and the adapter cartridge is formed to allow the recording medium and disk holder retaining this recording medium therein to be inserted into the case of the adapter cartridge via the access opening of the case.

10. A cartridge system according to claim 9, wherein the disk holder has an engaging section engaging the case of the adapter cartridge to retain the disk holder at a predetermined position within the case.

11. A cartridge system according to claim 9, wherein the disk holder has a retaining section engaging the recording medium to retain the recording medium.

12. A cartridge system according to claim 9, wherein the disk holder has a retaining section for engaging that portion of the recording medium which is other than a central portion and an area opposite to the window sections of the case, to retain the recording medium.

13. A cartridge system according to claim 9, wherein the disk holder has an elastic section for elastically engaging the case of the adapter cartridge and case of the disk cartridge.

* * * * *

UNITED STATES PATENT AND TRADEMARK OFFICE
CERTIFICATE OF CORRECTION

PATENT NO.     : 6,463,028 B1
DATED          : October 8, 2002
INVENTOR(S)    : Koshiyouji It is certified that error appears in the above-identified patent and that said Letters Patent is hereby corrected as shown below:

<u>Title page,</u>
Item [22], the PCT filing date should read:
-- [22] PCT Filed: Jun. 1, 1999 --

Signed and Sealed this

Eighteenth Day of February, 2003

JAMES E. ROGAN
*Director of the United States Patent and Trademark Office*